(12) United States Patent
Guibert et al.

(10) Patent No.: US 7,418,579 B2
(45) Date of Patent: Aug. 26, 2008

(54) COMPONENT WITH A DYNAMICALLY RECONFIGURABLE ARCHITECTURE

(75) Inventors: Mickaël Guibert, Nogent sur Marne (FR); Fabien Clermidy, St. Egreve (FR); Thierry Collette, Paliaiseau (FR)

(73) Assignee: Commissariat a l'Energie, Paris (FR)

( * ) Notice: Subject to any disclaimer, the term of this patent is extended or adjusted under 35 U.S.C. 154(b) by 0 days.

(21) Appl. No.: 10/574,315

(22) PCT Filed: Sep. 30, 2004

(86) PCT No.: PCT/FR2004/050473

§ 371 (c)(1),
(2), (4) Date: Mar. 30, 2006

(87) PCT Pub. No.: WO2005/031493

PCT Pub. Date: Apr. 7, 2005

(65) Prior Publication Data

US 2007/0113054 A1    May 17, 2007

(30) Foreign Application Priority Data

Sep. 30, 2003    (FR) .................................. 03 50622

(51) Int. Cl.
*G06F 9/44* (2006.01)
*H03K 19/177* (2006.01)
(52) U.S. Cl. .......................... 712/226; 712/15; 326/38; 326/39
(58) Field of Classification Search .................. 326/38, 326/39; 712/226, 15
See application file for complete search history.

(56) References Cited

U.S. PATENT DOCUMENTS

| 5,760,607 | A | * | 6/1998 | Leeds et al. .................... 326/38 |
| 5,892,962 | A | | 4/1999 | Cloutier |
| 5,943,242 | A | * | 8/1999 | Vorbach et al. ............... 716/17 |
| 6,127,843 | A | * | 10/2000 | Agrawal et al. ............... 326/40 |
| 6,150,839 | A | | 11/2000 | New et al. |
| 6,157,210 | A | * | 12/2000 | Zaveri et al. .................. 326/40 |

OTHER PUBLICATIONS

Altera, "Flex 8000 Programmable Logic Device Family", pp. 361-363 (Jun. 1999).
DeHon, Andre, "Reconfigurable Architectures for General-Purpose Computing", Ph.D. Thesis, MIT (Abstract), 368 pages (Aug. 1996).
Fujii, Taro, et al., "A Dynamically Reconfigurable Logic Engine With a Multi-Context/Multi-Mode Unified-Cell Architecture", *IEEE International Solid-State Circuits Conference*, pp. 364-365, p. 479 (Feb. 1999).

(Continued)

*Primary Examiner*—Vibol Tan
(74) *Attorney, Agent, or Firm*—Thelen Reid Brown Raysman & Steiner LLP

(57) ABSTRACT

The invention relates to a component with a large grain dynamically reconfigurable architecture for processing of data by processing units organized in rows and connected to each other through interconnections so as to enable processing in pipeline or parallel mode or in dependent rows mode. All data types may be processed and the component may process several applications at the same time. The choice of the grain, control at several levels with limited control interconnection resources and the data distribution circuit enable local or general reconfiguration of the component in one clock cycle.

17 Claims, 11 Drawing Sheets

OTHER PUBLICATIONS

Goldstein, S. Copen, et al., "PipeRench: A Reconfigurable Architecture and Compiler", in *IEEE Computer*, vol. 33, No. 4, pp. 70-77 (Apr. 2000).

John, L. K. et al., "A Dynamically Reconfigurable Interconnect For Array Processors", ieee Transactions on Very Large Scale Integration (VLSI) Systems, *IEEE. Inc.*, vol. 6, No. 1, pp. 150-157 Mar. 1998.

Levine, Benjamin A., et al., "PipeRench: Power and Performance Evaluation of a Programmable Pipelined Datapath", Hot Chips 14, Palo Alto, CA (Aug. 2002).

Sassatelli, G., et al., "Highly Scalable Dynamically Reconfigurable Systolic Ring-Archticture for DSP Applications", *Proceedings Desing, Automation and Test in Europe* (Mar. 2002).

Tau, Edward, et al., "A First Generation DPGA Implementation", in proceedings of the Third Canadian Workshop on Field-Programmable Devices, pp. 138-143 (May 1995).

JTAG; Test Technology Standards Committee "IEEE Std. 1149.1 Standard Test Access Port and Boundry-Scan Architecture", Institute of Electrical and Electronics Engineers (Oct. 1993).

\* cited by examiner

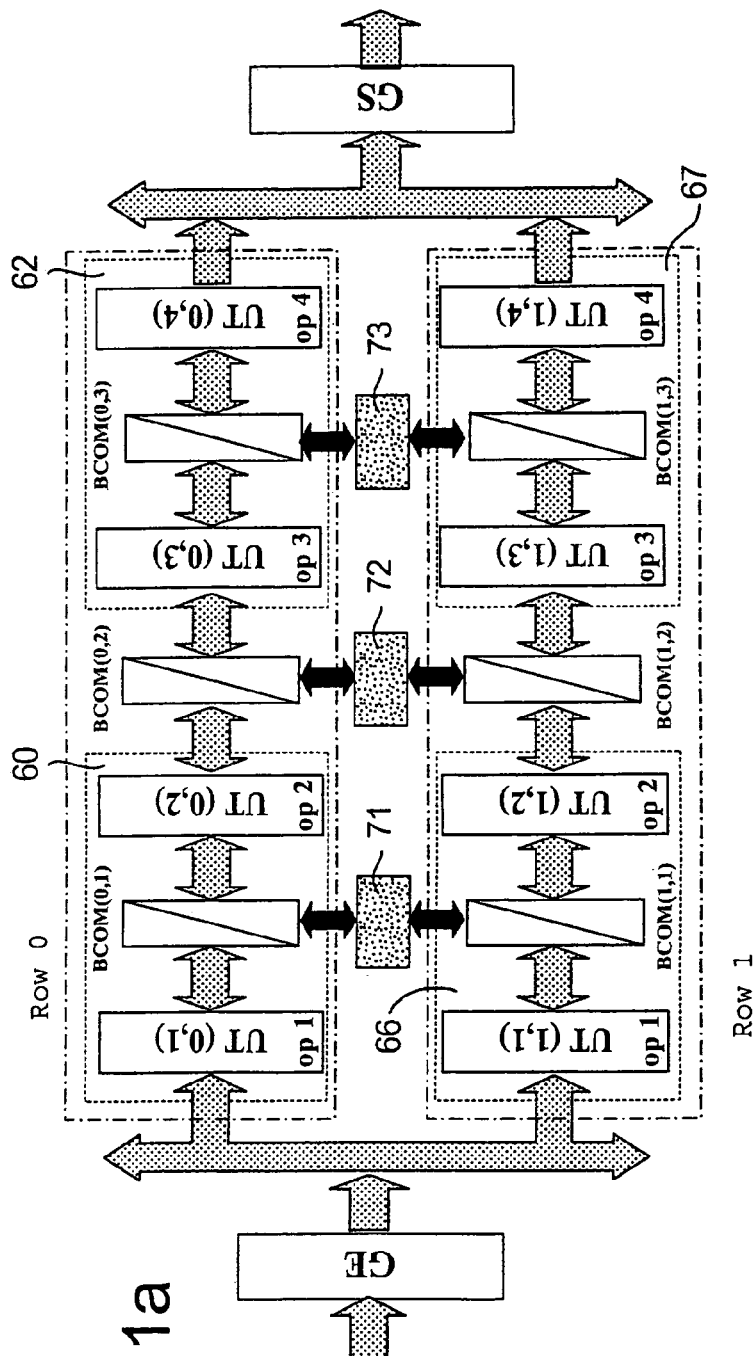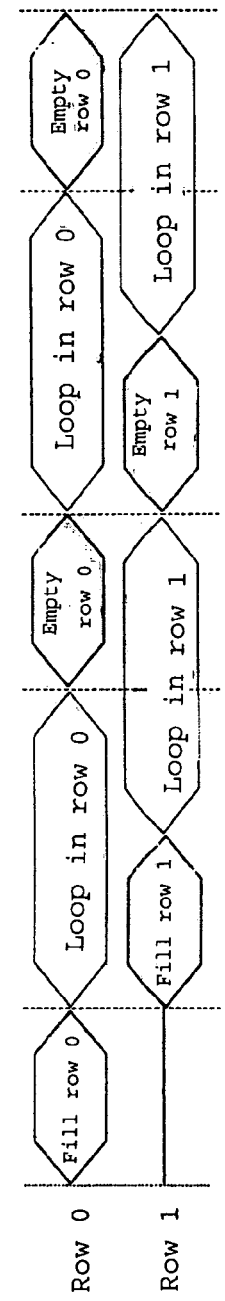
FIG. 11a
FIG. 11b

COMPONENT WITH A DYNAMICALLY RECONFIGURABLE ARCHITECTURE

CROSS-REFERENCE TO RELATED APPLICATION

This application claims priority based on International Patent Application No. PCT/FR2004/050473, filed on Sep. 30, 2004, entitled "Component with a Dynamically Reconfigurable Architecture" by Mickael Guibert, Fabien Clermidy and Thierry Collette, which claims priority of French Application No. 0350622, filed on Sep. 30, 2003, and which was not published in English.

TECHNICAL DOMAIN

The invention relates to the domain of dynamically reconfigurable components specifically designed for data processing, particularly for execution of instructions corresponding to the various tasks of an application.

STATE OF PRIOR ART

Conventionally, the end purpose of dynamically reconfigurable components is the optimized use of their hardware resources during data processings carried out to produce an application. It is usually a reconfiguration designed to obtain the highest possible usage rate of a component. In other cases, the objective is to use the reconfiguration to improve the robustness of a component (in other words so that it can continue to operate even if some of its hardware resources fail), or to achieve a very high flow of data processed by the component or low energy consumption while the component is in use. Reconfiguration can also be used to optimize data processing in parallel on elementary processors of the component.

There are different ways of producing an application: with an application specific integrated circuit (ASIC), with a processor or with a field programmable gate array (FPGA) that the user can program.

An ASIC offers optimum spatial production because operators are wired to the silicon directly; however, since this type of component is dedicated to a given application, and cannot be used to change from one type of application to another (or if it can, in a degraded manner).

The use of a processor enables a time-specific implementation of an application, translated into sequences of instructions that can be carried out by the processor, reusing its processing unit in each cycle. Depending on the processor instructions set, this technique offers good flexibility for applications that can be processed and moreover the architecture is very compact. The main disadvantage of the processor is the performance, which is much lower than for dedicated ASICs.

Programmable components (or reconfigurable components) such as FPGAs introduce an alternative between the processor and the ASIC; an application is implanted on a matrix of pre-characterized processing cells (fine grains of the component) with a large number of interconnections. However, current use of FPGAs is usually limited to a single implanted configuration while it is desirable to make reconfigurations during execution. Therefore, a spatial rather than a time distribution of the application has to be made; the ability of the FPGA to reconfigure itself to make another application is not used. There are two main reasons for this lack of dynamic reconfiguration; firstly, the majority of FPGAs only authorizes total reconfiguration of the component, which leads to very high time penalty (typically from a few milliseconds to a few hundred milliseconds) since the application has to be rerouted to cable the operators in an optimum manner; secondly, because the grain of the FPGAs is very fine so that it can be adapted to a large number of applications, wiring of operations has the disadvantage of being complex and requiring a high transmission capacity for a large number of bits (at control buses).

Patent U.S. Pat. No. 6,150,839 discloses a new type of FPGA that has two cache levels so that it can partially reconfigure itself. The architecture of this FPGA is in the form of two sets of cells each of which is associated with a cache memory, and each of these memories is able to contain one or several contexts for the set of cells. This type of FPGA has several disadvantages; cells are configured in packets of cells and several clock cycles are necessary to load a new configuration; furthermore, the inter-cell communication structure is complex and involves global buses, and the resulting very extensive interconnection possibilities mean that interconnection resources are predominant over processing resources.

The so-called DPGA (Dynamically Programmable Gate Array) [1,2] architecture developed at MIT in 1994, has a fairly simple cell comprising a Look-Up Table (LUT) with four inputs and a programmable switch, as its fine grain. These cells are grouped by blocks of 16 within a 4×4 matrix. Putting these elements into an array forms the DPGA. Two interconnection networks cohabit in this architecture. The first network is local to the block of cells; each cell can use the outputs from the cells in the same row or the same column (namely 6 bits) as input, and it is also possible that the cell can use its own output as input. The second network is used to provide each block with global signals. Blocks communicate with each other using "crossbars" that enable each cell to receive two global signals for each adjacent matrix (namely 8 bits because each matrix contains 16 cells and can therefore supply 16 bits to its adjacent cells). Therefore, there is a choice between 15 bits for the LUT inputs for each cell, namely its output, the 6 bits of the adjacent cells, the 8 bits of the adjacent matrices. The DPGA is capable of memorizing four contexts (or configurations), which authorizes fast passage from one to the other. However, this component does have some disadvantages:

- the interconnection structure is too complex to support data flow type applications (for example multimedia, interactive or cryptography type applications);
- the simplicity of context control (two wires for the component) limits the possibilities of producing the component at the reconfiguration;
- processing results are maintained at the output from the cell, so that all inputs from the producer to the final consumer need to be maintained;
- a single configuration number is distributed for the entire component.

The PipeRench architecture [3,4] was developed to use the reconfiguration in pipeline mode so as to produce data flow type applications. This is a large grain architecture based on relatively complex (fine grain) PE (for Processing Element) cells organized in stripes or cell stages (large grains). These physical stripes (wired on silicon) are organized in rows and are connected to each other through interconnections used to produce a ring; this physical ring is used to make the pipeline. PipeRench breaks down an application to be produced into a number of elementary operations that are then distributed into virtual stripes (virtual stages described in memory). Due to the large size of PE cells, it is usually impossible to have as many physical stripes as are necessary on the component; therefore PipeRench virtualizes the necessary hardware resources by reconfiguring the physical stripes so that they perform all operations of the application in sequence. Each step in the application corresponds to a particular configuration of a physical stage of the architecture. Data move from stage to stage performing the different processing steps, which makes it difficult to perform non-deterministic processings for which the application is data dependent. Furthermore, not all processing stages are necessarily present in the physical architecture, consequently each stage must only depend on the data in the previous stage. However, a particular register structure can make data transit towards a lower stage applying the same pipeline as for conventional data; however, this requires that loopbacks can only take place within a single stage (loopbacks between stages being prohibited), registers being used to perform retroactions within a stage. When a stage is discharged from the architecture, its configuration must be saved so as to keep the state of its internal variables for its reuse. Data are then transferred between stripes unidirectionally, and this is why the configurations are stored in a single memory and are transferred block by block to stripes to be reconfigured. PipeRench has other disadvantages:

- the stripes are complex because they use local interconnections between PE cells;
- the very large number of bits to be transmitted to update the configuration of the stripes;
- applications processed must be of the data flow type and they must only have short internal loops (on a single stripe);
- PE cells (more sophisticated than FPGA cells) correspond to a grain that is still too fine to be able to perform complex processings;
- if a processed application is too long to be done considering the number of stripes, the latency time for complete processing may become very long;
- finally, the consumption of the component is about 30% greater than the consumption of a conventional processor.

Therefore reconfigurable components according to prior art have some disadvantages or limitations; interconnection resources are predominant over processing resources, their grain is too fine, the routing resources necessary to control the component are too large, they cannot be adapted to all applications in a given domain (for example all symmetric algorithms in cryptography) and they cannot process different applications at the same time, they are not suitable for several types of processing (data flow or dependent data), their usage rate is not high particularly when multimode processing (pipeline or parallel or combined) is done, and they cannot be modulated in terms of energy consumption (low consumption or high throughput).

PRESENTATION OF THE INVENTION

Therefore, the invention is intended to overcome the disadvantages mentioned above but also to assure structural security and robustness (reconfiguration following a malfunction of a part of the component) of the dynamic reconfigurable component.

Complex operators (for choosing the grain) are preferred and interconnection resources are limited, so as to be able to balance interconnection and processing resources in the component. Exchanges related to control are limited by setting up a small number of control bits while exchanging broad exchanges of data to be processed. Global routing resources were deleted and all that are kept are local or pseudo-local resources useful for data transfers. This choice is related to the choice of the basic grain of the component architecture according to the invention.

In its basic embodiment, the component with the dynamically reconfigurable architecture for processing data according to the invention is a component comprising a data processing block TD and a general controller CG capable of controlling the data processing block TD characterized in that:

- the block TD comprises a plurality of reconfigurable elementary data processing blocks BE; each elementary block BE comprises two inputs, E1 and E2 for reception of data to be processed, and one output S for transmission of processed data; a common input data bus being capable of transmitting data to be processed to the input E1 of each of the blocks BE and the controller CG; for each block BE, an output data bus connected to its output S, being capable of transmitting processed data outside the component and through a bypass data bus to the input E2 of a single other block BE;
- the controller CG is capable of initializing configurations of blocks BE and controlling their dynamic reconfiguration, controlling data flows at the output from each block BE so as to transmit data either towards the outside or to the input E2 of another block BE, and controlling data flows at the input of each block BE.

This basic embodiment is used to overcome some disadvantages encountered in prior art, particularly concerning the complexity of interconnections that is strongly reduced in this case. The grain of the basic version of the component is the elementary processing block BE, that can be capable of processing complex operations, and interconnections for serial or parallel transmission, or output towards the outside, between each consecutive pair of BE blocks. Obviously, the controller CG is capable of managing saturation problems of each block BE and conventionally it is also capable of emitting requests towards the outside to have the data to be processed received by the block TD (the block TD being capable of receiving data from outside the component), receiving instructions from the outside for processing of data by the block TD, and memorizing them and exchanging control signals with the outside.

The basic embodiment of the component according to the invention is illustrated in FIG. 1, on a particular example; the component comprises a data processing block TD (1) and a general controller CG (2), the block TD can receive data from the outside (3) and comprises three elementary data processing blocks BE (4,5,6); the inputs E1 and E2 and the output S are indicated on the block (4), the input E1 of each block BE is connected to the common data bus (7), the output S of each block BE is connected to an output bus (8,9,10) leading to the outside and to the input E2 of a single other block through a bypass data bus (11,12,13). Control buses connecting the controller CG (2) to the blocks BE or to the outside are not shown.

In one embodiment with maximum use of the block dependent on the basic embodiment, the controller CG of the component according to the invention is capable of controlling transmission of data received from the outside on the common input data bus as and when they arrive, in sequence to each of the blocks BE, the data being transmitted to the next block BE when the maximum processing capacity of the previous block BE is reached.

This embodiment manages saturation of blocks and assures that each block is used at the maximum of its processing capacities. For example, the maximum capacity of each block can be predefined (and given to the controller CG) or a block may notify the controller CG that it is saturated during processing.

In another embodiment of the component according to the invention, called the multiple processing modes embodiment, dependent on one of the two previous embodiments, the controller CG is capable of initializing configurations of blocks BE block by block, and controlling the dynamic reconfiguration of blocks, block by block, so as to make the block TD capable of processing data in pipeline mode or in parallel mode or in combined mode.

Processing can be done in pipeline mode with this version of the component, in other words making data circulate from output S in one block to input E2 of the block to which it is connected through a bypass bus, or in parallel mode, in other words using the blocks independently (the block processes data transmitted through the common input data bus and transmits the result to the output, the bypass bus is then not used), or in combined mode, in other words some blocks operate in parallel and others in pipeline. This version of the component is particularly advantageous for its adaptation flexibility and also because it is used to process different applications at the same time, on blocks BE operating in independent mode, unlike in prior art, due the block by block reconfiguration.

Another embodiment of a component with a dynamically reconfigurable architecture according to the invention, said to be an embodiment with rows of processing units, is a component conform with any one of the previous embodiments and in which:
- each block BE in the block TD comprises a plurality of configurable data processing units UT and corresponds to a row in a matrix network of units UT in the block TD; the units UT in each pair of successive units in each block BE being capable of exchanging data through an associated configurable two-directional communication block BCOM dedicated to these two units;
- the input unit UT for each block BE that corresponds to the first unit UT on the row corresponding to the block, is capable of receiving data received on inputs E1 or E2 of the block as input, and the output unit UT from the block that corresponds to the last unit UT on the row corresponding to the block, is capable of transmitting data processed at the output S from the block as output;
- for each block BE, the controller CG is capable of receiving instructions from the outside for processing data by each unit UT in the block and memorizing these data, initializing configurations for each unit UT and for each block BCOM in the block BE and controlling their dynamic reconfiguration.

This embodiment uses communication blocks BCOM enabling two-directional communications between adjacent processing units UT in the same block BE; this organization of a block BE enables good configuration flexibility of the block (since each UT is reconfigurable), particularly for multimode processings. Furthermore, a simple interconnection for control buses can be used between units UT, blocks BCOM and the controller CG; for example, each unit UT of each block BE may be connected to the controller CG through a common control bus for the block BE; similarly, each block BCOM in each block BE may be connected to the controller CG through a common control bus for the block BE. Those skilled in the art will note that during operation in parallel, the structure with an even number of units UT on a row is more efficient; after a block BE has been filled with data (from the beginning to the end of the block), and when the block BE is saturated with data, units can operate in pairs if the number of units UT is even and due to the two-directional nature of the blocks BCOM, while there will remain an unused unit if the number of units is odd. The structure of the block TD is equivalent to a matrix network; the blocks BE and their units UT, form the rows, and from one row to the next, units UT (with corresponding rank on the rows) form the columns.

FIG. 2 shows an example structure of a block BE of the component with rows of processing units; the block BE (14) comprises 4 processing units UT (15) alternating with communication blocks BCOM (16); the input unit UT (15) in the block can receive data input through a data bus (18) and the output unit UT (17) from the block is connected to the output S from the block, as output (19). The units UT are connected through a common control bus (20) to the controller CG (not shown), and the communication blocks BCOM are connected through a common control bus (21) to the controller CG.

Another embodiment of the component according to the invention, dependent on the embodiment with rows of processing units, is a component called a component with inter-row registers in which:
- blocks BCOM of each pair of blocks BCOM, for which the associated units UT are on adjacent columns and adjacent rows in the matrix network of units in block TD, and are capable of exchanging data through an associated inter-row register REG, so as to enable data to be exchanged between units UT from one row to the next;
- the controller CG is capable of controlling the dynamic reconfiguration of units UT and blocks BCOM of the block TD to make the block TD capable of processing data in the dependent rows mode, for at least two adjacent rows in the matrix network, by controlling the switching of data between two blocks BE corresponding to two adjacent rows, through an inter-row register REG between these two rows.

The inter-row register component is particularly advantageous in that it provides a means of obtaining an additional processing mode not available in prior art, namely mode with dependent rows (or equivalently, with dependent blocks BE). This further increases the processing possibilities and can improve the usage ratio of resources of the component and the data flow. For example, if there are two rows each capable of processing 256 data bits, the changeover to dependent mode between these rows provides a means of processing 512 data bits. Those skilled in the art will note that with a PipeRench architecture, the best that is possible with two stripes is to reconfigure one stripe and do an execution on the other, for each clock tick; as a result, only one data item can be processed at any one time, while with the architecture according to the invention two items of data can be processed with two adjacent units because the units are reconfigured during unit to unit transfers.

The invention also relates to a component with register control, which is an embodiment dependent on the previous mode with inter-row registers, in which the controller CG is capable of transmitting RESET or ENABLE type or clock signals through a control bus to each register REG in the block TD, and in which each inter-row register REG between two blocks BCOM is capable of:
- storing data received from a block BCOM in a memory and making the data available for the other block BCOM;
- receiving RESET or ENABLE or clock type signals sent by the controller CG and executing commands corresponding to these signals.

This inter-row register control, for storage in order to transmit data between two communication blocks, activated by the ENABLE command, or to reset the storage memory to zero, activated by the RESET command, is used to facilitate management of transfers by the controller CG.

Another embodiment of the invention dependent on any one of the previous embodiments, relates to a component with multiplexing in which the inputs E1 and E2 of a block BE are the inputs of a multiplexer associated with the block, the output from the multiplexer being connected to the input of the input unit UT of the block BE for transmission of data to this unit.

Therefore this version of the component can simplify connections, by having only a single input for the input unit UT of block BE, to receive data from inputs E1 or E2 of the block.

The embodiment of the invention dependent on any one of the embodiments of the component with rows of processing units or inter-row registers or with register control or with multiplexing, relates to a component with a bank of cells in which the data processing units UT of block TD are banks of configurable synchronous elementary data processing cells CE, each bank comprising at least one elementary cell CE; the cells CE in any unit UT of any block BE are connected to a common control bus that connects them to the controller CG, the controller CG being capable of controlling cells CE and controlling their reconfiguration; for each pair of adjacent units UT in a block BE, the elementary cells of a unit UT are capable of exchanging data with the elementary cells in the other unit UT through the block BCOM associated with these units, the block BCOM being capable of making these data exchanges; each cell CE in the input unit UT of each block BE, that corresponds to the first unit UT on the row corresponding to the block, is capable of receiving data received at the input of the unit UT as input, through a data bus common to every cell CE in the unit UT; each cell CE in the unit UT output from each block BE, corresponding to the last unit UT on the row corresponding to the block, is capable of transmitting data to the output S from the block through a data bus common to every cell CE in the unit UT, as output.

This version of the component in which the configurable synchronous cell CE is the fine grain of the architecture (although it is large grain relative to architectures according to prior art), makes it possible to do work of elementary cells CE of a unit UT locally in parallel, while having fewer interconnections because the cells CE in the same processing unit do not exchange data with each other. A unit UT (or bank) usually comprises n cells CE and if k denotes the size of the operands manipulated by the elementary cells, the unit UT is capable of processing blocks of p bits, where p=n*k. FIG. 3 shows a bank UT of cells CE (22), in this case comprising 8 cells, and connections of each of these cells with an input data bus (23) for transmission of data to be processed, and with an output data bus (24) for transmission of processed data; cells CE are connected to the controller CG (not shown) through a common control bus (25).

FIG. 4 shows an example of connections between two banks of adjacent cells CE within the block through a block BCOM, for a block BE; the block BCOM (26) enables transmission of data between a cell CE (28) in a first unit UT and the cells (29), (30) and (31) in a second unit UT according to control signals received from the controller CG by these cells, through the cell control bus (32), and by the block BCOM through the control bus (33); the cell (35) receiving data from the cell (34). This shows two-directional transfers (27) enabled by the block BCOM between cells in different banks (or units), while the cells CE in the same unit UT do not communicate (for example cells (28) and (35)).

The invention also relates to an embodiment of the component, said to be the embodiment with local communication control, dependent on the previous embodiment with bank of cells, in which each block BCOM associated with units UT comprises:

a transmission block BT capable of exchanging data between elementary cells CE in a unit UT and the cells CE in another unit UT with which the BCOM is associated; the block BT being capable of being configured by a local block controller CLB;

a local block controller CLB capable of receiving and interpreting control signals from the controller CG and configuring the block BT, according to configuration data received and stored in a local configuration memory MB, for data transmission; the controller CLB being capable of managing loading into memory MB as a function of control signals received from the controller CG;

a general controller CG capable of controlling local controllers CLB of the block TD;

This component with local control of communication has new advantages; the communication blocks BCOM are actually reconfigurable and elementary cells CE to be interconnected (between adjacent units UT in a block BE) can be chosen, this additional degree of freedom providing further processing flexibility and efficiency in the use of cells (particularly for mapping of elementary operators in cells). Communications between banks through blocks BCOM are two-directional, which is an advantage for PipeRench type components in which the passage of data between stripes is single-directional. For example, the controller CLB will typically include a finite state machine (FSM) in addition to the RAM (Random Access Memory).

In another embodiment of the component according to the invention, with local cell control dependent on the embodiment with a bank of cells or the embodiment with a local communication controller, each synchronous elementary cell CE in a bank comprises:

an operator block BO capable of receiving input data through an input data bus, storing them and performing processing on these data according to configuration signals originating from a local cell controller CLC; transmitting the result of the processing to the output through an output data bus;

a local cell controller CLC capable of:

receiving data through the input data bus;

managing different operating modes of the cell CE, in other words an initialization mode, to load cell configuration words in a local configuration memory MC, a test mode to perform structural tests on the cell, and a normal mode for execution of data processing operations as a function of configuration signals emitted by the controller CG and received by the local controller through the common control bus;

managing loading into memory MC as a function of a cell operating mode indicated by the controller CG;

interpreting configuration signals received from the controller CG to either load a corresponding configuration word into a local configuration register RCL to maintain it throughout the data processing cycle by the cell, or to configure the block BO as a function of a configuration word appearing in the register RCL;

perform structural tests of the cell CE on reception of a test mode signal sent by the controller CG;

a general controller CG capable of controlling the local controllers CLC of the block TD.

In this component with local cell control, the cells CE in a bank are reconfigurable. Therefore the treatment is more efficient and particularly it is possible to process several applications. The block TD can then process these different applications, even simultaneously. Furthermore, tests can be carried out on cells and thus failures can be detected. Those skilled in the art will note that the operating strategy of the component is different from the operating strategy according to prior art in which adjacent "cells" can communicate together, in this invention, a cell reconfiguration is used to swap data between cells (in different banks). The control strategy is based on a two-level control; the general controller CG at the high level of the architecture and the local control both at fine grain level (controllers CLC of cells CE) and at communication blocks level (controllers CLB). Unlike the FPGA in patent U.S. Pat. No. 6,150,839 in which the reconfiguration is done by blocks of cells, in this invention, cell by cell reconfiguration is possible; furthermore, the architecture according to the invention can be reconfigured in one clock cycle instead of several cycles necessary for this FPGA (due to the time necessary to load the new configuration in a block). As an example embodiment, the block BO typically comprises an LUT, a RAM and an Arithmetic Logic Unit (ALU).

In another embodiment of a component according to the invention, or component with configuration by number, that depends on the previous embodiment with local cell control, the local cell controller CLC is capable of interpreting configuration signals received from the controller CG so as to firstly read a cell configuration number on the common control bus and then load a configuration word locally corresponding to this number, according to a local correspondence table, in the RCL register; cell configuration numbers being stored in a controller memory CG and the controller CLC being capable of memorizing the local correspondence table.

This embodiment has the advantage that it requires much fewer transmission resources, and therefore simplifies component connections. Transmission of a simple configuration number requires a much narrower control bus than transmission of a configuration word; this being possible due to the local correspondence table. Furthermore, the local correspondence between a number and a configuration word introduces a useful degree of freedom; a same number can correspond to different configuration words in different cells, since the correspondence tables are local.

The invention also relates to an embodiment of the component called the embodiment with BYPASS, dependent on the previous embodiment with configuration by number or the embodiment with local cell control, in which the controller CG is capable of receiving a malfunction indication resulting from a structural test applied to a cell CE, from this cell, and sending a command to the local controller CLC of the cell CE to configure this cell in BYPASS mode.

This embodiment with BYPASS results in a robust component at cells CE.

Similarly, it is possible to obtain robustness at blocks BCOM due to an embodiment of a component according to the invention called with communication BYPASS, that depends on the previous embodiment with BYPASS and the embodiment with local communication control, in which the local block controller CLB of a communication block BCOM, connected to a unit UT, is capable of configuring the block BCOM in BYPASS mode when the controller CG, having received a malfunction indication from one or several cells CE of the unit UT, transmits a signal to force a change to BYPASS mode to the controller CLB; the controller CG being capable of controlling a changeover of a block BCOM of a unit UT to BYPASS mode when a command to configure a cell CE of the unit UT into BYPASS mode has been transmitted to the local controller CLC of the cell CE.

Degraded operation of the component (in other words with loss of units UT or blocks BCOM) is allowable with the embodiment with communication bypass. Those skilled in the art will note in particular that the possibility of controlling cells or blocks BCOM in BYPASS mode makes it possible to have units UT or "additional" blocks BCOM in a block BE that are not used if there is no malfunction but that can be activated (through the controller CG) if there is a malfunction in the block; this further reinforces the robustness of the component.

One embodiment of a component according to the invention, said to be with local register, can increase the processing capacity of the component. In this embodiment that is dependent on any one of the embodiments with a bank of cells, or with local communication control, or local cell control, or configuration by number, or with bypass, or with communication bypass, the result of data processing done by a cell CE can be stored in a local register; a result stored in this local register being maintained during reconfiguration of the cell.

Therefore the component with local register can save data calculated during a reconfiguration, and another advantage related to this backup (even if the block BE of the component is "minimal" in other words reduced to two units UT and a block BCOM) is that, due to the block BCOM with two-directional communication, it is possible to process two items of data at the same time in block BE and transmit the results, while in a PipeRench architecture it is only possible to process one item of data with two stripes (one stripe reconfigures itself while the other does the processing) and this obviously assumes that the data are saved during the reconfiguration. Another important advantage due to this local register is that stored data can be swapped between two units UT during the reconfiguration phase, which contributes to masking the reconfiguration cycle.

Another embodiment of a component according to the invention that is depending on any one of the previous embodiments of the invention, relates to a component with input-output management comprising:

an input management block GE capable of receiving data from the outside and temporarily storing these received data, formatting stored data according to the initialization mode or normal mode indicated by the controller CG through a specific control bus, transmitting formatted data to the input E1 of blocks BE of the block TD through the common input data bus;

an output management GS block connected to the controller CG through a specific control bus for controlling reception of processed data, connected to the output data bus from each of the blocks BE in the block TD to receive processed data, and capable of reformatting the received processed data, storing the reformatted data in a buffer memory, receiving a transmission request from the outside, transmitting data stored in the buffer memory to the outside following a request received from the outside.

This version of the component, with input-output management, facilitates data exchanges with the outside (particularly with temporary data storage) and therefore use of the component by various devices. Those skilled in the art will note that the input manager GE simplifies the installation of an application to be processed (or application mapping) on the component.

FIG. 5 shows an example of a component with input-output management; an input manager GE (36) that receives data from the outside through a data bus (43) and transmits formatted data with three blocks BE (40,41,42) through a common data bus (44); the output data buses from blocks BE (45,46,47) are connected to the output manager GS (37) that transmits reformatted data to the outside through a data bus (48); the general controller CG is connected to a GE through a control bus (38), to GS through a control bus (39), to the blocks BE1, BE2 and BE3 respectively, through the control buses (49,50,51).

Those skilled in the art know that it must be possible to test a reconfigurable component regularly. One well known method of doing this is the JTAG method [5], standardized by IEEE, that is also used for loading (or reloading) configuration words due to the possibility available with the IEEE standard to use instructions specific to a user; the component must then include a TAP controller and specific control buses.

This is why another embodiment of a component according to the invention, dependent on any one of the embodiments of the component with local cell control or configuration by number or with BYPASS, or with communication BYPASS, or with local register, or with input-output management, is a component with JTAG in which the local controller CLC of cell CE, the local controller CLB of block BCOM and the general controller CG are capable of using a JTAG method to load configurations during the dynamic component reconfiguration phase, and to perform tests; the controller CG comprising a TAP controller connected through JTAG serial buses, block BE by block BE, to cells CE and blocks BCOM in block TD.

The choice of the JTAG protocol applied locally, is quite compatible with the choice of control at two different levels mentioned above. This choice is explained by the fact that it is required to be able to reconfigure cells in a very short time (not more than one clock period); a reconfiguration closest to the base operator is the most efficient because information exchanges and therefore interpretation of these exchanges are minimized. One of the advantages of this choice is that it can considerably reduce routing resources for control (one bus for a few control bits instead of a control bus the same width as a configuration word), and this important saving can reduce the constraint for data buses.

FIG. 6 is an illustration of an example insertion of a JTAG string in an assembly within a block BE, comprising two banks of cells CE and the associated communication block BCOM; the string JTAG (52) is connected in sequence to cells CE in the first bank (53), to the block BCOM (54) and cells CE in the second bank (55); this control connection also comes from control buses (without JTAG) of cells (56) and the control bus of block BCOM (57) that are connected to the controller CG (not shown).

Another component according to the invention is a large grain component conforming with any one of the embodiments of the invention with rows of processing units, or with inter-row registers, or with register control, or with multiplexing, or with bank of cells, or with local communication control, or with local cell control, or with configuration by number, or with BYPASS, or with communication BYPASS, or with local register, or with input-output management, or with JTAG, in which there is an even number N of units UT on network rows and the blocks BCOM are distributed in N/2 basic cells CB, each cell CB comprising two adjacent units UT and the block BCOM associated with these units; the controller CG being capable of controlling dynamic reconfiguration of cells CB in the network and communication blocks BCOM between cells CB, row by row, to make the block TD capable of processing data using cells CB.

This version of the component according to the invention shows up a very important device in terms of data processing, namely the basic cell CB. Thus, there is a reconfigurable architecture with three hierarchical levels; the elementary cell CE (fine grain) for synchronous execution of elementary operations, the base cell (large grain) to perform complex processing, and finally the component itself. The variable number of base cells configured to execute data processing then determines the high data speed or low energy consumption nature of the component. This nature, that can be adapted depending on control signals (at the controller CG), combined with important configuration (or reconfiguration) possibilities of each cell CB (through the configuration or reconfiguration of cells CE and the block BCOM) makes it possible to achieve the purposes of the invention.

Finally, the invention relates to a final embodiment of the component dependent on the large grain embodiment, called independent large grain component, for processing of a set of applications comprising at least one application, in which each basic cell CB in the block TD configured to perform processing can perform the operations necessary for complete processing of at least one application of the assembly, each application of the assembly possibly being done completely by at least one basic cell CB.

This large independent grain component is the optimum version of the component with a dynamically reconfigurable architecture according to the invention. It is capable of processing a set of applications (or possibly a single application) using base cells capable of processing these applications independently. This independence of cells CB provides a means of optimally benefiting from the very flexible possibilities for reconfiguring the component and using various processing modes, in pipeline, in parallel, combined, or in dependent rows, or various combinations of them.

BRIEF DESCRIPTIONS OF THE FIGURES

The characteristics and advantages of the invention mentioned above, and others mentioned in the following description of particular embodiments given as examples, will become clearer after referring to the appended figures, wherein:

FIG. 1, described above, shows the basic embodiment of the component according to the invention, in a special case with three elementary blocks BE;

FIG. 2, described above, shows an example structure of a block BE of the component with rows of processing units;

FIG. 3 described above, shows a processing unit UT with cells CE of the component with a bank of cells;

FIG. 4, described above, shows an example for a block BE, showing connections between two adjacent banks of cells CE within the block BE through a block BCOM of a component with a bank of cells;

FIG. 5, described above, shows an example of a component with input-output management;

FIG. 6, described above, is an illustration of an example insertion of a string JTAG into a part of a component with JTAG;

FIG. 11 is a diagram showing steps in parallel mode operation of an independent large grain component.

DETAILED PRESENTATION OF A PARTICULAR EMBODIMENT

The operation of one example embodiment of an independent large grain component according to the invention comprises several phases that may correspond to different usage strategies. Among these phases, we will describe details (for example) of the initialization phase and the normal operation phase for operation in parallel.

Figure 1:
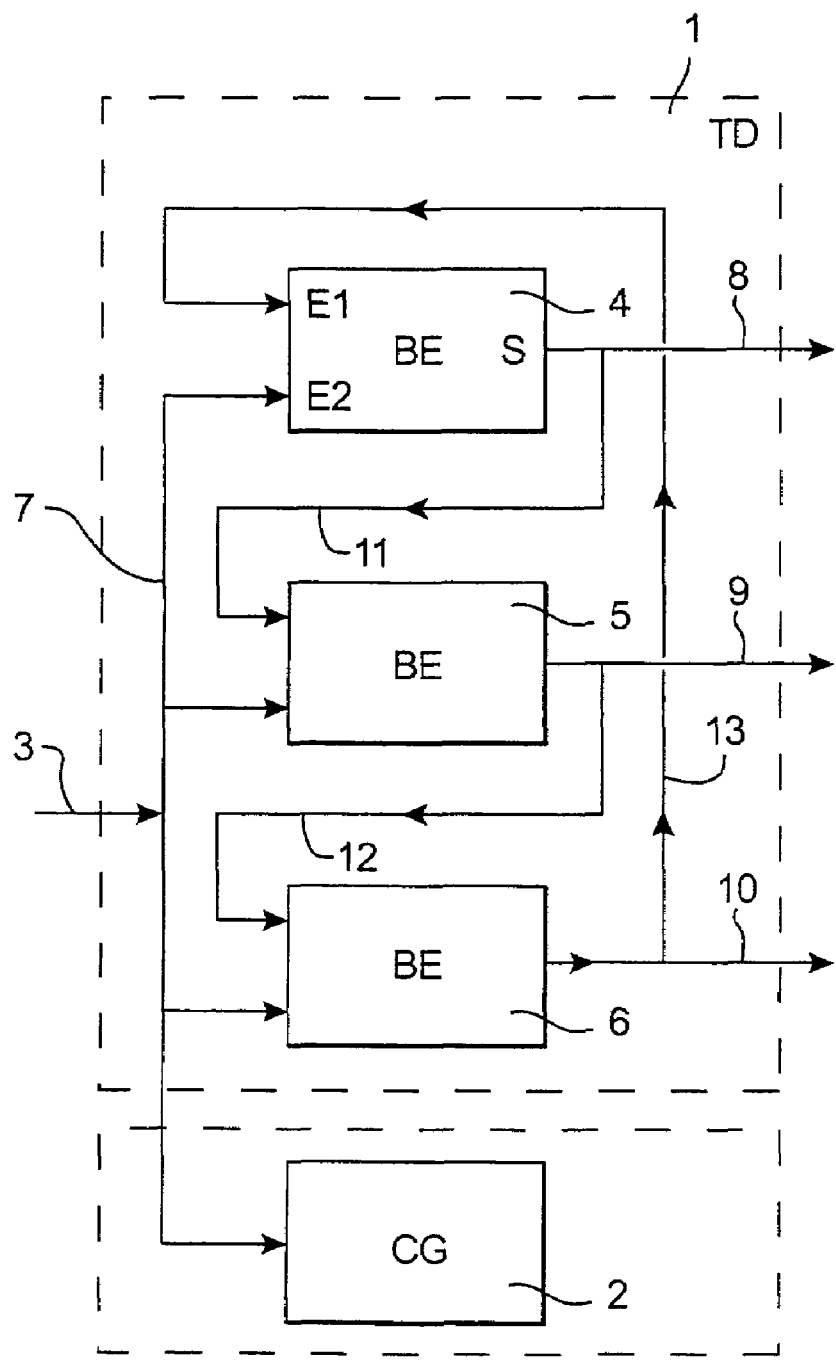
Figure 2:
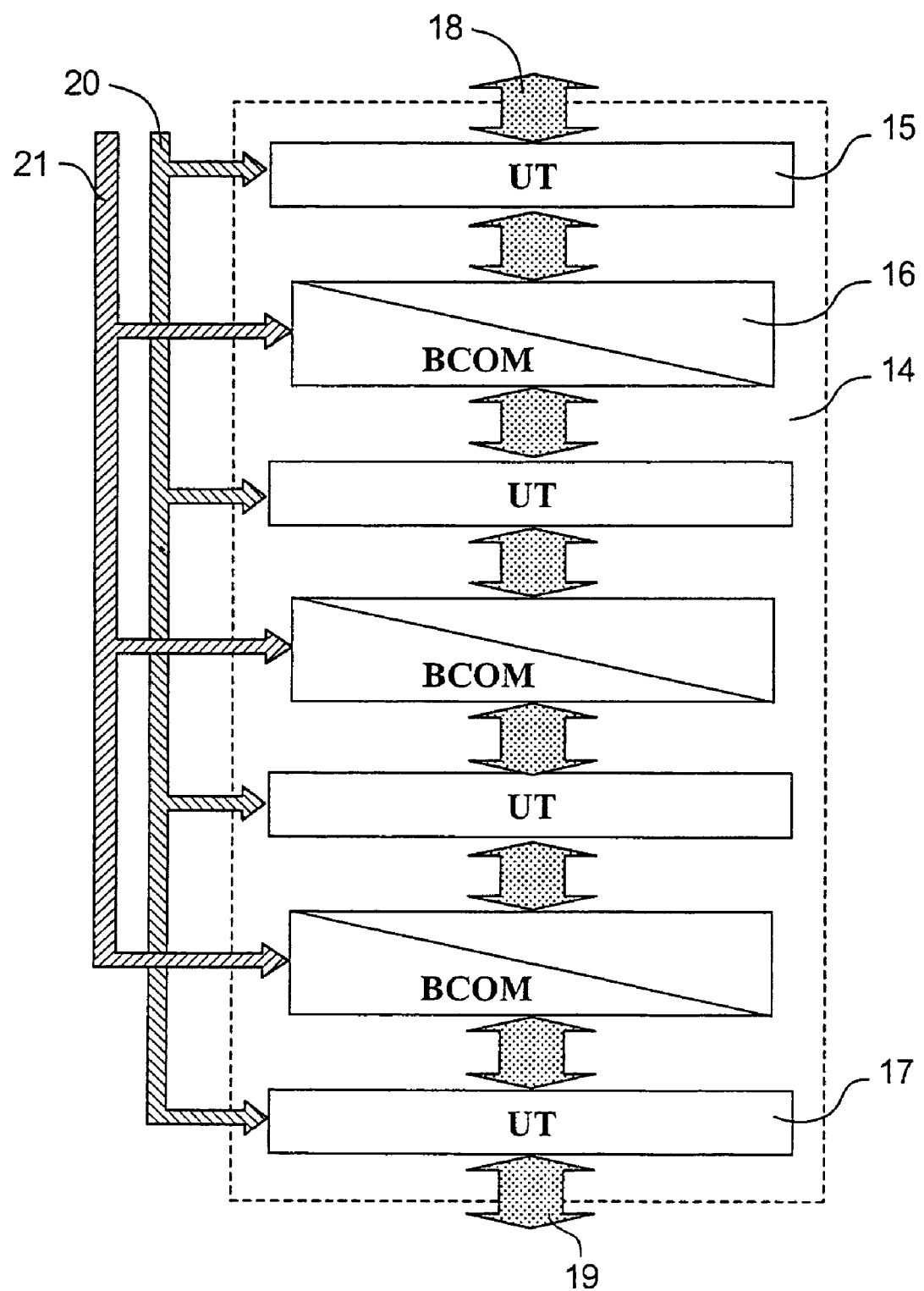
Figure 3:
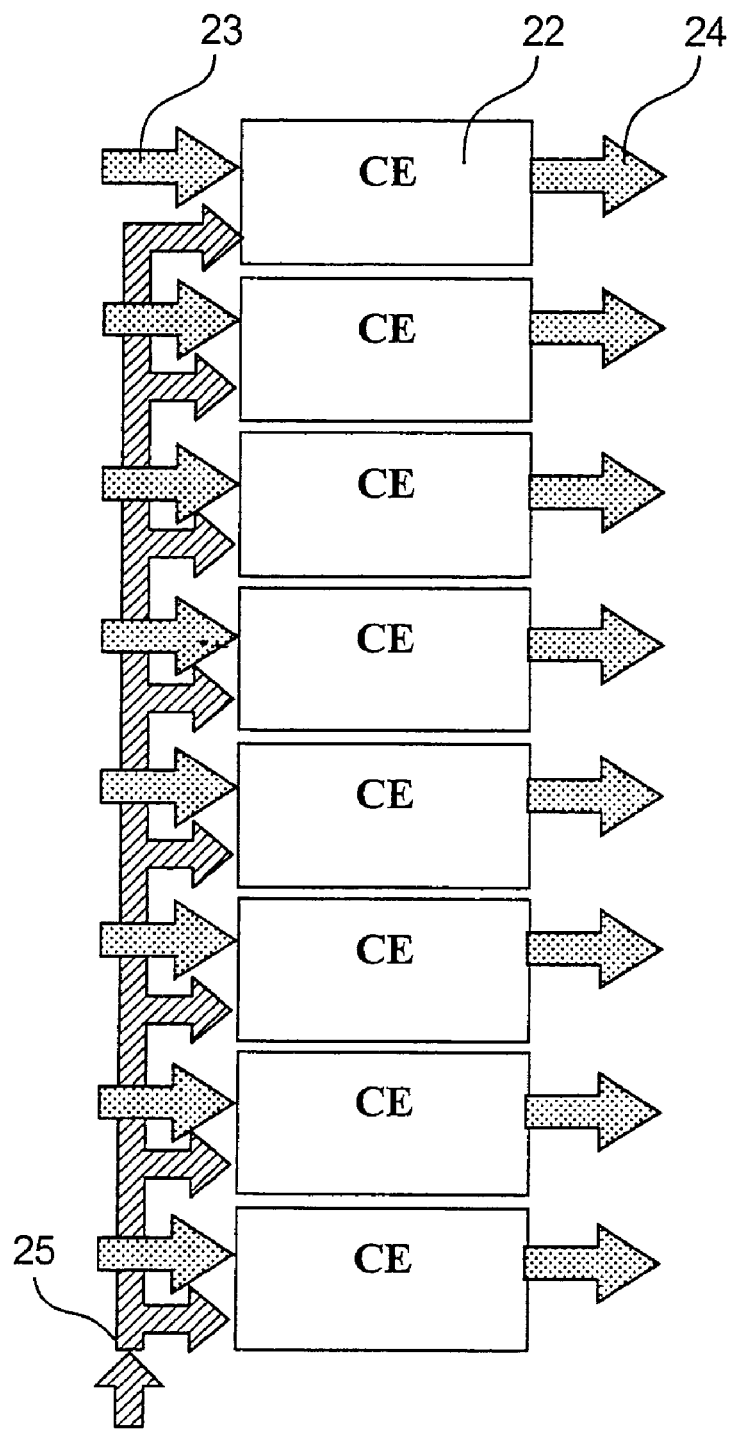
Figure 4:
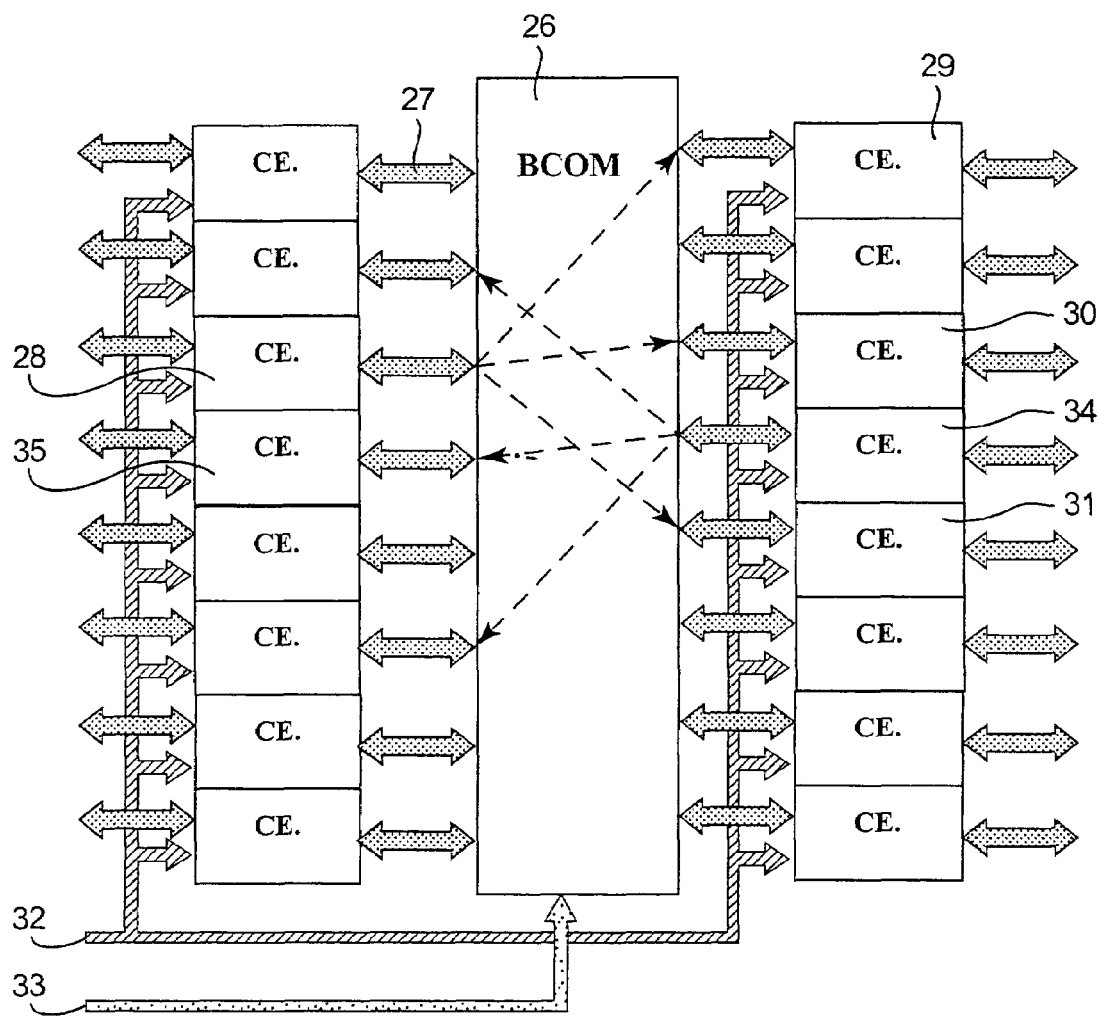
Figure 5:
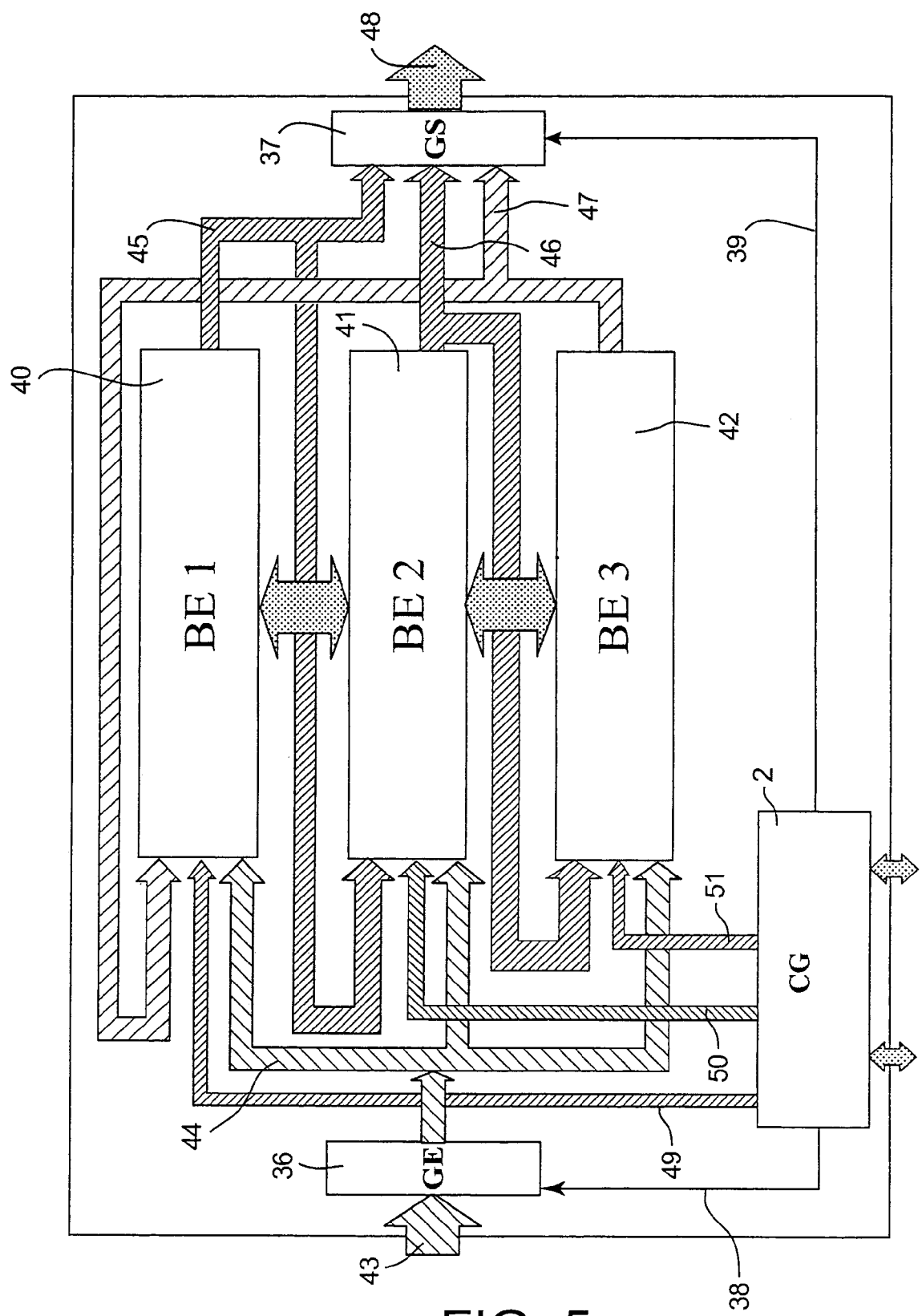
Figure 6:
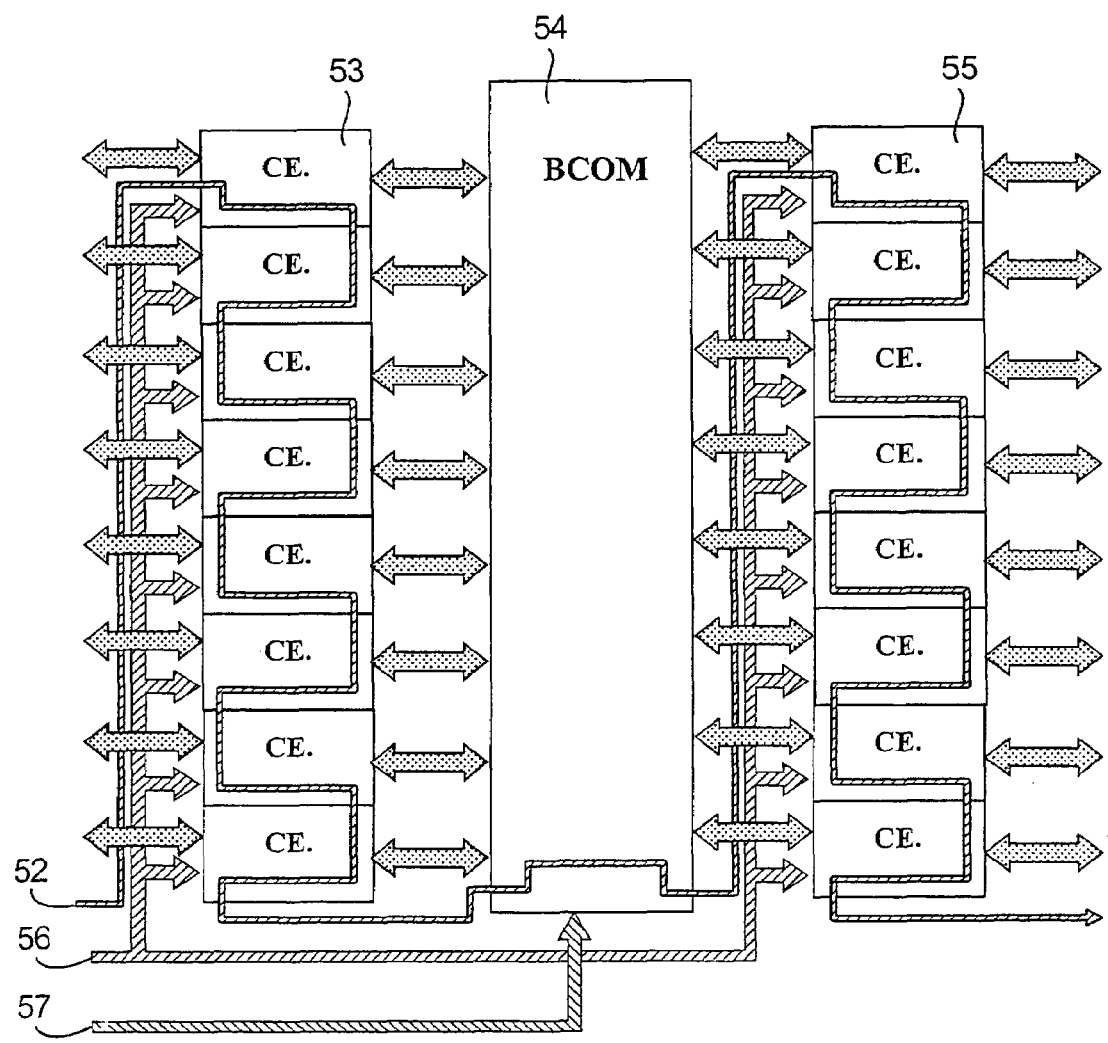
Figure 7:
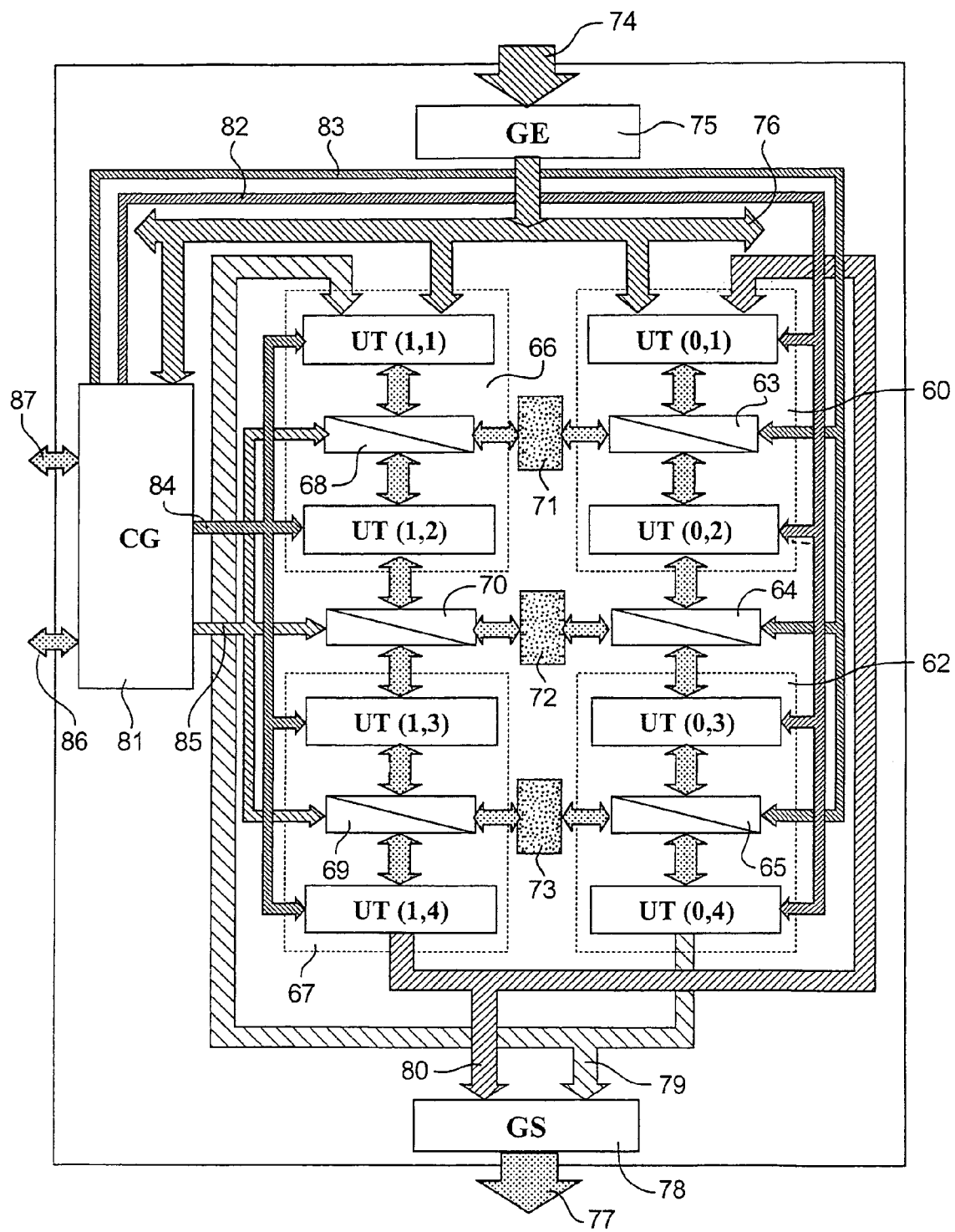
FIG. 7 is a diagram of an overview of an independent large grain component.

FIG. 7 shows the example of a selected component; a component with two rows (or two blocks BE), the index 0 row and the index 1 row, with two base cells CB on each row and their processing units UT indexed by a pair (i,j) where i is the row index and j is the column index. Thus, on row 0, cell CB(0,1) (60) comprises units UT(0,1) and UT(0,2) and their associated communication block BCOM(0,1) (63) for which, by convention, the indexes are the indexes for the unit UT preceding the block on the row; the second cell CB(0,2) (62) on the row communicates with the first cell through block BCOM(0,2) (64) and comprises units UT(0,3) and UT(0,4) and the block BCOM(0,3) (65). Similarly, the second row comprises base cells CB(1,1) (66) and CB(1,2) (67) formed from UT(1,1), BCOM(1,1) (68), UT(1,3) and UT(1,3), BCOM(1,3) (69), UT(1,4) respectively that communicate through block BCOM(1,2) (70). The inter-row registers (71, 72,73) control communication between blocks BCOM(0,1) (63) and BCOM(1,1) (68), BCOM(0,2) (64) and BCOM(1,2) (70), BCOM(0,3) (65) and BCOM(1,3) (67) respectively. The component comprises an input data bus for block TD (74), an input manager GE (75) connected to the common input data bus (76), an output data bus for block TD (77) connected to the output manager GS (78) that receives output data buses for rows 0 (79) and 1 (80) respectively. The general controller CG (81) connected to the common control bus for units UT of row 0 (82) and to the common control bus for blocks BCOM of row 0 (83), to the common control bus of units UT of row 1 (84) and to the common control bus of blocks BCOM of row 1 (85); the controller CG being capable of exchanging control signals with the outside (86) or with a peripheral shift register (87) ('Boundary Scan') for the JTAG check.

a) The Initialization Phase

During this phase, the different useful configuration data are loaded into the different memories. This phase exists after a power up reset or after a provoked software reset. Loading is done through the data bus (76) (loading in parallel). The first step is to load the configurations of cells row by row in sequence, and the same procedure is then used for communication blocks. Tests are then carried out on the component to check that the initial configuration is correct and structural security (for example with a BIST test); after this step, the controller CG notifies the outside that the component is ready to receive data.

b) Operation in Parallel Phase

In this example, the rows function independently of each other and all steps described below are synchronized to the clock (identified by Clock on the drawings).

There are three operating steps in each row:
a row loading step 1, for example row 0, the row being considered as being a pipeline that is filled.

Figure 8A:
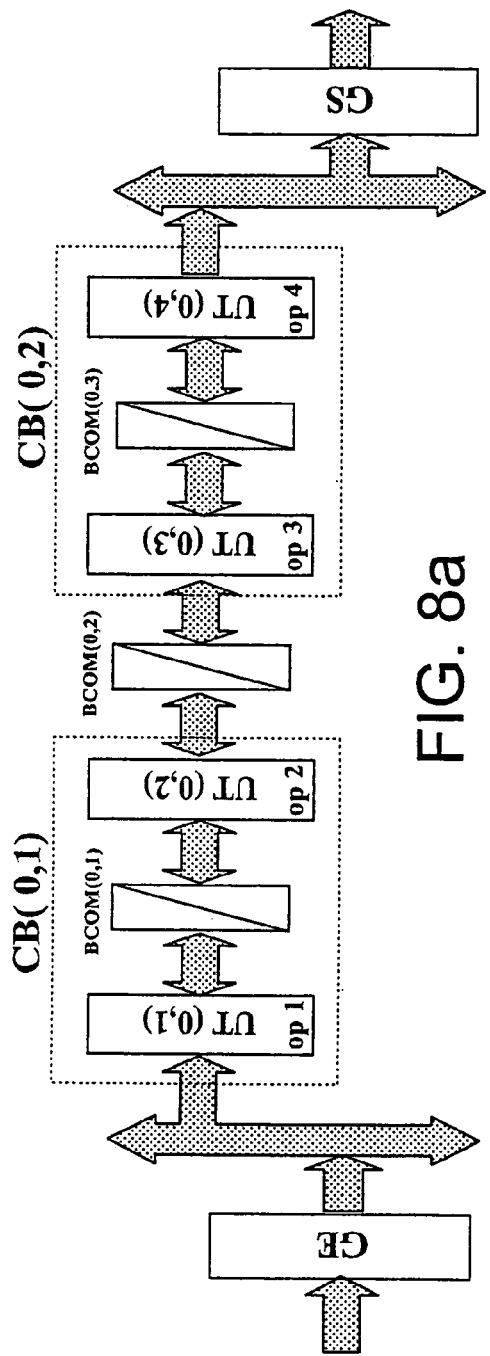
FIG. 8 is a diagram illustrating the filling phase for a row of base cells in parallel mode.
Figure 8B:
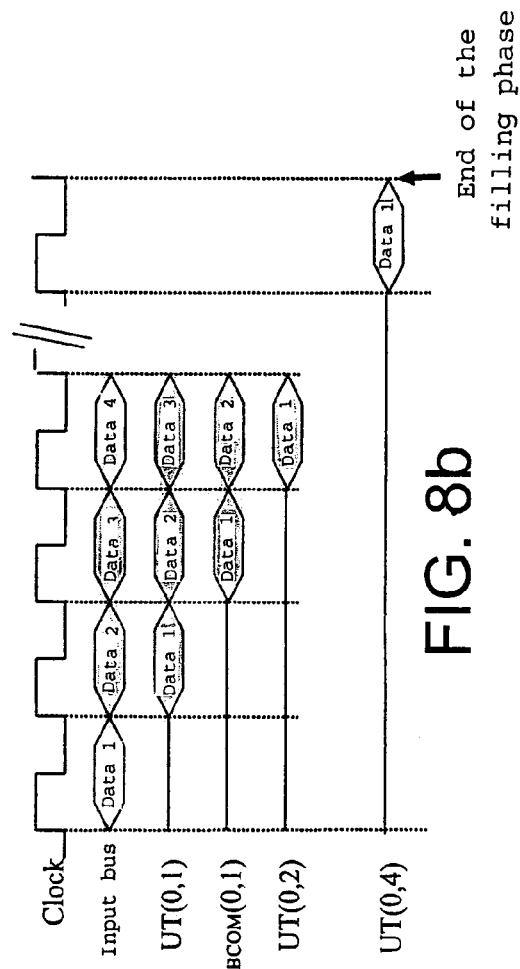

Step 1 is illustrated for filling of row 0 (with reference to FIG. 7), in FIG. 8: on 8*a*, operations carried out by units are indicated by op1, op2 etc.; 8*b* shows a chronogram corresponding to operations carried out on row 0, the clock pulses being shown at the top of the chronogram (Clock).

The manager GE recovers data blocks, for example 64-bit blocks, and reconstructs the p-bit word that will be sent to the first unit UT for row UT(0,1) in the first cell CB(0,1). The first data item 1 that executes operation 1 is loaded into UT(0,1) and the result is then transferred to UT(0,2); UT(0,1) then executes operation 1 on a data block 2 while UT(0,2) executes operation 2 on data block 1. The transfer is repeated until the end of the row is reached (all processing units are occupied by a data item).

a loop step 2 (example for row 0): to perform the remainder of the processing to be done (in the application), only using row resources. The next step is to work by base cells (independent) to perform the processing in parallel.

Figure 9A:
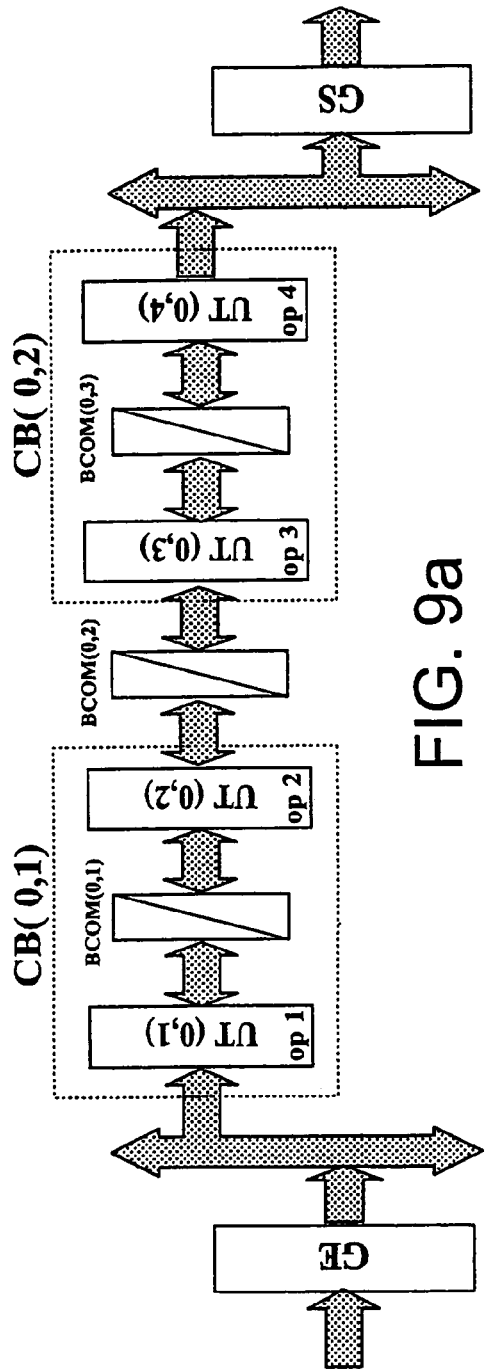
FIG. 9 is a diagram illustrating the loopback phase for a row of base cells in parallel mode.
Figure 9B:
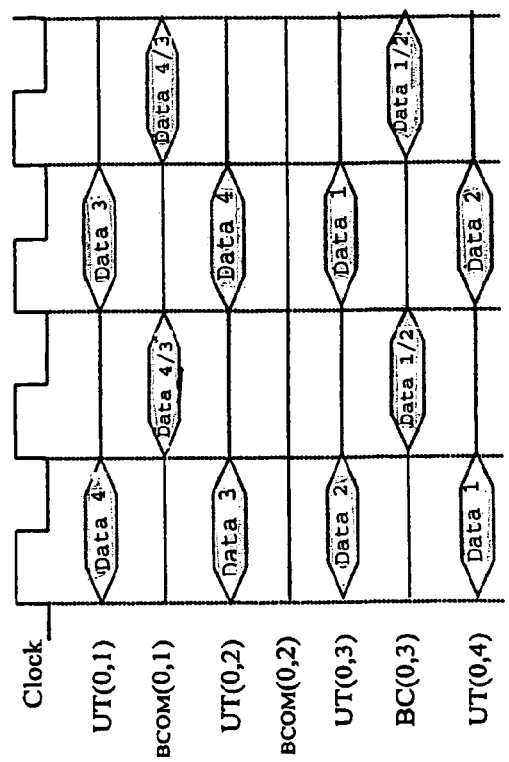
Figure 10A:
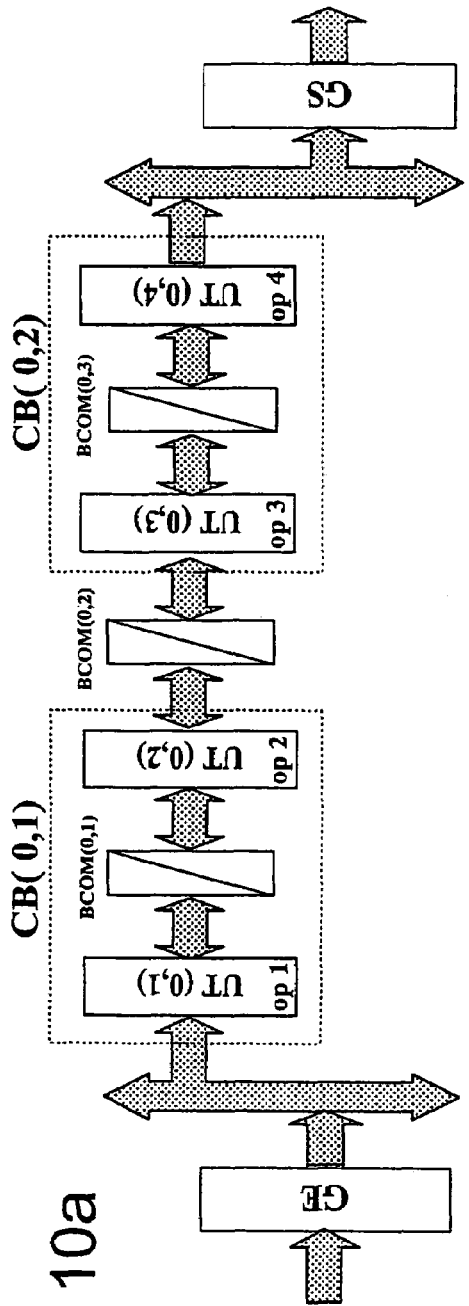
FIG. 10 is a diagram illustrating the emptying phase for a row of base cells in parallel mode.
Figure 10B:
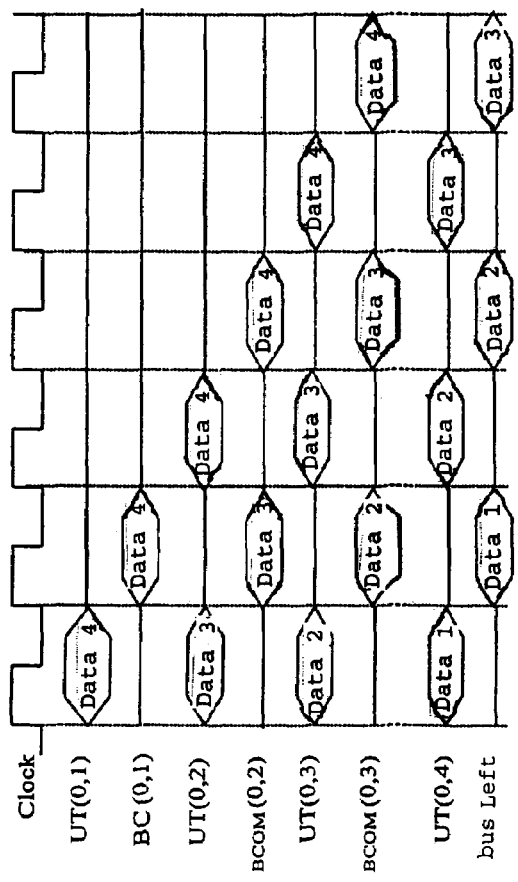

Step 2 is illustrated for the loop back for row 0 in FIG. 9; 9*a* shows the operations carried out by units in the row; 9*b* shows a chronogram for this loop back step; the "data 4/3" notation indicating a swap of processed data 4 and 3 between units UT(0,1) and UT(0,2).

a row emptying step 3 illustrated for emptying row 0 in FIG. 10; 10*a* shows operations performed by units in the row; 10*b* shows a chronogram for this emptying step:

at the end of the algorithm, the base cell connected to the output bus CB(0,2) will be able to unload processed data and the pipeline emptying phase is started. Unit UT(0,4) of the second cell unloads the data block 1 that has just been processed in the manager GS. However, the last operation has not yet been carried out on the data block 2 in UT(0,3). Therefore it goes into UT(0,4) so that this operation can be performed, unit UT(0,2) transferring its data block 3 to UT(0,3) etc, until row 0 has been completely emptied.

As soon as the output manager has new processed data, it sends an external signal notifying that it can be retrieved. This scheme is repeated in parallel for row 1.

FIG. 11 summarizes the previous steps and indicates processing done in parallel on rows 0 and 1 of the component shown in 11*a*. The steps carried out on each of these rows, over time, are shown on a chronogram at 11*b*.

REFERENCES

[1]: E. Tau, I. Eslick, D. Chen, J. Brown, A. DeHon: 'A First Generation DPGA Implementation', in Proceedings of the Third Canadian Workshop on Field-Programmable Devices, pages 138-143, May 1995.

[2]: Andre DeHon: 'Reconfigurable Architectures for General-Purpose Computing', Ph.D. Thesis, MIT, August 1996.

[3]: S. Copen Goldstein, H. Schmit, M. Budiu, S. Cadambi, M. Moe and R. Taylor: 'PipeRench: A Reconfigurable Architecture and Compiler', in IEEE Computer, vol. 33, N° 4, April 2000.

[4]: Benjamin A. Levine and Herman H. Schmit 'PipeRench: Power and Performance Evaluation of a Programmable Pipelined Datapath', Hot Chips 14, Palo Alto, Calif., August 2002.

[5]: JTAG; Test Technology Standards Committee "IEEE Std. 1149.1 Standard Test Access Port and Boundary-Scan Architecture", Institute of Electrical and Electronics Engineers, Oct. 21, 1993.

The invention claimed is:

1. Component with a dynamically reconfigurable architecture for processing data comprising a data processing block TD and a general controller CG capable of controlling the data processing block TD characterized in that:

the block TD comprises a plurality of reconfigurable elementary data processing blocks BE; each elementary block BE comprises two inputs, E1 and E2 for reception of data to be processed, and one output S for transmission of processed data; a common input data bus being capable of transmitting data to be processed to the input E1 of each of the blocks BE and the controller CG; for each block BE, an output data bus connected to its output S, being capable of transmitting processed data outside the component and through a bypass data bus to the input E2 of a single other block BE;

the controller CG is capable of initializing configurations of blocks BE and controlling their dynamic reconfiguration, controlling data flows at the output from each block BE so as to transmit data either towards the outside or to the input E2 of another block BE, and controlling data flows at the input of each block BE, wherein the controller CG is capable of controlling transmission of data received from the outside on the common input data bus as and when they arrive, in sequence to each of the blocks BE, the data being transmitted to the next block BE when the maximum processing capacity of the previous block BE is reached.

2. Component according to claim 1 in which the controller CG is capable of initializing the configurations of blocks BE block by block, and controlling the dynamic reconfiguration of blocks, block by block, so as to make the block TD capable of processing data in pipeline mode or in parallel mode or in combined mode.

3. Component according to claim 2 in which:

each block BE in the block TD comprises a plurality of configurable data processing units UT and corresponds to a row in a matrix network of units UT in the block TD; the units UT in each pair of successive units in each block BE being capable of exchanging data through an associated configurable two-directional communication block BCOM dedicated to these two units;

the input unit UT for each block BE that corresponds to the first unit UT on the row corresponding to the block, is capable of receiving data received on inputs E1 or E2 of the block as input, and the output unit UT from the block that corresponds to the last unit UT on the row corresponding to the block, is capable of transmitting data processed at the output S from the block as output;

for each block BE, the controller CG is capable of receiving instructions from the outside for processing data by each unit UT in the block and memorizing these data, initializing configurations for each unit UT and for each block BCOM in the block BE and controlling their dynamic reconfiguration.

4. Component according to claim 3 in which:

blocks BCOM in each pair of blocks BCOM, for which the associated units UT are on adjacent columns and adjacent rows in the matrix network of units in block TD, and are capable of exchanging data through an associated inter-row register REG so as to enable data to be exchanged between units UT from one row to the next;

the controller CG is capable of controlling the dynamic reconfiguration of units UT and blocks BCOM of the block TD to make the block TD capable of processing data in dependent rows mode, for at least two adjacent rows in the matrix network, by controlling switching of data between two blocks BE corresponding to two adjacent rows, through an inter-row register REG between these two rows.

5. Component according to claim 4 in which the controller CG is capable of transmitting RESET or ENABLE type or clock signals through a control bus to each register REG in the block TD, and in which each inter-row register REG between two blocks BCOM is capable of:

storing data received from a block BCOM in a memory and making the data available for the other block BCOM;

receiving RESET or ENABLE or clock type signals sent by the controller CG and executing commands corresponding to these signals.

6. Component according to claim 5 in which the inputs E1 and E2 of a block BE are the inputs of a multiplexer associated with the block, the output from the multiplexer being connected to the input of the input unit UT of the block BE for transmission of data to this unit.

7. Component according to claim 6 in which the data processing units UT of block TD are banks of configurable synchronous elementary data processing cells CE, each bank comprising at least one elementary cell CE; the cells CE in any unit UT of any block BE are connected to a common control bus that connects them to the controller CG, the controller CG being capable of controlling cells CE and controlling their reconfiguration; for each pair of adjacent units UT in a block BE, the elementary cells of a unit UT are capable of exchanging data with the elementary cells in the other unit UT through the block BCOM associated with these units, the block BCOM being capable of making these data exchanges; each cell CE in the input unit UT of each block BE, that corresponds to the first unit UT on the row corresponding to the block, is capable of receiving data received at the input of the unit UT as input through a data bus common to every cell CE in the unit UT; each cell CE in the unit UT output from each block BE, corresponding to the last unit UT on the row corresponding to the block, is capable of transmitting data to the output S from the block through a data bus common to every cell CE in the unit UT, as output.

8. Component according to claim 7 in which each block BCOM associated with units UT comprises:

a transmission block BT capable of exchanging data between elementary cells CE in a unit UT and the cells CE in another unit UT with which the BCOM is associated; the block BT being configurable by a local block controller CLB;

a local block controller CLB capable of receiving and interpreting control signals from the controller CG and configuring the block BT, according to configuration data received and stored in a local configuration memory MB, for data transmission; the controller CLB being capable of managing loading into memory MB as a function of control signals received from the controller CG;

a general controller CG capable of controlling local controllers CLB of the block TD.

9. Component according to claim 7 in which each synchronous elementary cell CE in a bank comprises:

an operator block BO capable of receiving input data through an input data bus, storing them and performing processing on these data according to configuration signals originating from a local cell controller CLC; transmitting the result of the processing to the output through an output data bus;

a local cell controller CLC capable of:

receiving data through the input data bus;

managing different operating modes of the cell CE, in other words an initialization mode, to load cell configuration words into a local configuration memory MC, a test mode to perform structural tests on the cell, and a normal mode for execution of data processing operations as a function of configuration signals emitted by the controller CG and received by the local controller through the common control bus;

managing loading into memory MC as a function of a cell operating mode indicated by the controller CG;

interpreting configuration signals received from the controller CG to either load a corresponding configuration word into a local configuration register RCL to maintain it throughout the data processing cycle by the cell, or to configure the block BO as a function of a configuration word appearing in the register RCL;

perform structural tests of the cell CE on reception of a test mode signal sent by the controller CG;

a general controller CG capable of controlling the local controllers CLC of the block TD.

10. Component according to claim 9 in which the local cell controller CLC is capable of interpreting configuration signals received from the controller CG so as to firstly read a cell configuration number on the common control bus and then load a configuration word locally corresponding to this number, according to a local correspondence table, in the RCL register; cell configuration numbers being stored in a controller memory CG and the controller CLC being capable of memorizing the local correspondence table.

11. Component according to claim 9 in which the controller CG is capable of receiving a malfunction indication resulting from a structural test applied to a cell CE, from this cell, and sending a command to the local controller CLC of the cell CE to configure this cell in BYPASS mode.

12. Component according to claim 8 in which the local block controller CLB of a communication block BCOM, connected to a unit UT, is capable of configuring the block BCOM in BYPASS mode when the controller CG, having received a malfunction indication from one or several cells CE of the unit UT, transmits a signal to force a change to BYPASS mode to the controller CLB. The controller CG being capable of controlling a changeover of a block BCOM of a unit UT to BYPASS mode when a command to configure a cell CE of the unit UT into BYPASS mode has been transmitted to the local controller CLC of the cell CE.

13. Component according to claim 7 in which the result of data processing done by a cell CE can be stored in a local register; a result stored in this local register being maintained during reconfiguration of the cell.

14. Component according to claim 1 comprising:

an input management block GE capable of receiving data from the outside and temporarily storing these received data, formatting stored data according to the initialization mode or normal mode indicated by the controller CG through a specific control bus, transmitting formatted data to the input E1 of blocks BE of the block TD through the common input data bus;

an output management GS block connected to the controller CG through a specific control bus for controlling reception of processed data, connected to the output data bus from each of the blocks BE in the block TD to receive processed data, and capable of reformatting the received processed data, storing the reformatted data in a buffer memory, receiving a transmission request from the outside, transmitting data stored in the buffer memory to the outside following a request received from the outside.

15. Component according to claim 9 in which the local controller CLC of cell CE, the local controller CLB of block BCOM and the general controller CG are capable of using a JTAG method to load configurations during the dynamic component reconfiguration phase, and to perform tests; the controller CG comprising a TAP controller connected through JTAG serial buses, block BE by block BE, to cells CE and blocks BCOM in block TD.

16. Component according to claim 3 in which there is an even number N of units UT on network rows and the blocks BCOM are distributed in N/2 basic cells CB, each cell CB comprising two adjacent units UT and the block BCOM associated with these units; the controller CG being capable of controlling dynamic reconfiguration of cells CB in the network and communication blocks BCOM between cells CB, row by row, to make the block TD capable of processing data using cells CB.

17. Component according to claim 16, for processing of a set of applications comprising at least one application, in which each basic cell CB in the block TD configured to perform processing can perform the operations necessary for complete processing of at least one application of the assembly, each application of the assembly possibly being done completely by at least one basic cell CB.

* * * * *